US011070515B2

(12) United States Patent
Cochran et al.

(10) Patent No.: US 11,070,515 B2
(45) Date of Patent: Jul. 20, 2021

(54) DISCOVERY-LESS VIRTUAL ADDRESSING IN SOFTWARE DEFINED NETWORKS (71) Applicant: International Business Machines Corporation, Armonk, NY (US)

(72) Inventors: Marc Cochran, Shrewsbury, MA (US); Eran Gampel, Tel Aviv (IL); Gal Sagi, Hod Hasharon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/454,328

(22) Filed: Jun. 27, 2019

(65) Prior Publication Data
US 2020/0412688 A1 Dec. 31, 2020

(51) Int. Cl.
*H04L 29/12* (2006.01)
*G06F 9/455* (2018.01)
*H04L 12/741* (2013.01)

(52) U.S. Cl.
CPC ...... *H04L 61/1552* (2013.01); *G06F 9/45558* (2013.01); *H04L 45/745* (2013.01); *H04L 61/305* (2013.01); *H04L 61/3055* (2013.01); *G06F 2009/45595* (2013.01); *H04L 61/6022* (2013.01); *H04L 61/6086* (2013.01)

(58) Field of Classification Search
CPC ....... G06F 9/45558; G06F 2009/45595; H04L 45/745; H04L 61/15; H04L 61/1511; H04L 61/1552; H04L 61/2503; H04L 61/2507; H04L 61/301; H04L 61/303; H04L 61/305; H04L 61/3055
See application file for complete search history.

(56) References Cited

U.S. PATENT DOCUMENTS

| 8,549,120 | B2 | 10/2013 | Bhat et al. |
| 9,112,929 | B2 | 8/2015 | Liu et al. |
| 9,237,087 | B1* | 1/2016 | Risbood ............... H04L 45/00 |
| 9,619,662 | B1* | 4/2017 | Beda, III ............ G06F 9/45558 |
| 9,787,586 | B2 | 10/2017 | Gurkan et al. |

(Continued)

FOREIGN PATENT DOCUMENTS

| CN | 103607430 B | 4/2018 |
| CN | 109040180 A | 12/2018 |
| WO | 201771780 A1 | 5/2017 |

OTHER PUBLICATIONS

Wikipedia, Virtual Extensible LAN, https://en.wikipedia.org/wiki/Virtual_Extensible_LAN, Apr. 15, 2019.

*Primary Examiner* — William G Trost, IV
*Assistant Examiner* — William C McBeth
(74) *Attorney, Agent, or Firm* — Garg Law Firm, PLLC; Rakesh Garg; Michael O'Keefe (57) ABSTRACT

A virtual address of a destination of a packet is parsed into a set of virtual address components. A subset of the set of virtual address components is tokenized into a token. The token is converted into at least a portion of a hostname. A look-up of a real network address corresponding to the hostname is performed. The packet is caused to be transmitted to the real network address, wherein the real network address corresponds to a host machine on a physical network, the receiving virtual entity operating on the host machine.

22 Claims, 7 Drawing Sheets

(56) References Cited

U.S. PATENT DOCUMENTS

| | | | |
|---|---|---|---|
| 9,942,104 B2 | 4/2018 | Flavel et al. | |
| 2005/0021841 A1* | 1/2005 | Yoshimoto | H04L 61/1511 |
| | | | 709/238 |
| 2012/0079055 A1* | 3/2012 | Robinson | H04L 61/1511 |
| | | | 709/213 |
| 2015/0089499 A1* | 3/2015 | Hsuan | G06F 9/45558 |
| | | | 718/1 |
| 2015/0172115 A1 | 6/2015 | Nguyen et al. | |
| 2017/0171232 A1* | 6/2017 | Graham-Cumming | |
| | | | H04L 61/1511 |

* cited by examiner

DISCOVERY-LESS VIRTUAL ADDRESSING IN SOFTWARE DEFINED NETWORKS

TECHNICAL FIELD

The present invention relates generally to a method, system, and computer program product for addressing. More particularly, the present invention relates to a method, system, and computer program product for discovery-less virtual addressing in software defined networks.

BACKGROUND

A data processing environment comprises a variety of hardware, software, and firmware networking components. A physical network, also called a data plane or an underlay, is a network of physical components where actual networking operations are performed and computational workloads are executed.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using virtual representations of the underlying physical components.

Physical networks usually exist within the demarcated boundary of the data processing environment whose physical components are utilized in the physical network. Unlike a physical network, an SDN can be designed to span across one or more data processing environments. For example, while a physical network may be contained within a datacenter, an SDN may span across one or more datacenters.

As an example, a logical representation of a physical network interface card (NIC) can participate in an SDN, such that a function of a virtual network interface card (VNIC) attributed to the logical representation of a NIC in the SDN is actually performed by the underlying physical NIC in a physical data processing system in the underlay. Similarly, a logical representation of a switch or a networking gateway can participate in an SDN, such that a function attributed to the logical representation of the switch or the networking gateway in the SDN is actually performed by the underlying switch or the networking gateway component, respectively, in the underlay.

A physical computing machine can be represented and used in an SDN as a virtual device—a virtual machine (VM), which is also referred to as an Edge in a Network Virtualization Environment (NVE). An application configured to execute on an edge essentially is executed on the underlying physical computing machine in a similar manner.

In an SDN, because the actual physical networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN.

Henceforth in this disclosure, any reference to a component within the context of an SDN is a reference to a logical representation of the component, which participates in the SDN, unless expressly distinguished where the reference is made. For example, a reference to a hypervisor in communication with an SDN controller is a reference to a logical representation of the hypervisor that operates in the SDN managed by the SDN controller and not to the hypervisor component of a machine that actually performs a task in the physical network. Similarly, as another example, a reference to a switch in communication with an SDN controller is a reference to a logical representation of the switch that operates in the SDN managed by the SDN controller and not to the switch hardware that actually performs a task in the physical network. Similarly, as another example, a reference to a function performed by an application on an edge, or a reference to a function caused to occur on such an application by the SDN controller, is a reference to the function performed by the execution of the application on the underlying physical computing machine.

A VM comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be created for a variety of other purposes.

An image is a binary package that can be installed on a hardware to instantiate a VM on the hardware. A layer is a software package that participates in an image. An image can include any number of software packages, whose layers are assembled together in the image as a monolithic binary. A single image can, but need not necessarily, represent an application.

A commonly used method of virtualization—traditional virtualization—preconfigures various VM configurations as template images (templates). When a VM having a specific predetermined configuration has to be created on a compute node, a suitable template is selected from a template storage, such as a database or a file-system, and installed on the compute node to create a VM having the desired configuration. An image of a VM in traditional virtualization is a monolithic binary image.

Another method for virtualization is container-based virtualization. Container-based virtualization, also called operating system virtualization, is an approach to virtualization in which the virtualization layer runs as an application within the operating system. In this approach, the operating system's kernel runs on the hardware node with several isolated application environments installed on top of it. The isolated guest application environments are called containers. In other words, a container is a running instance of an image of a VM in which the layers are distinguishable from one another.

Container-based virtualization is a way to operate several VMs on the same host, where the VMs share the same kernel and memory space among themselves and with the host. The isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

This method of virtualization is significantly different from the traditional virtualization technology where the hardware is emulated using a software emulation layer, which causes provisioning latencies, slow startup times, and decreased performance of the underlying hardware. These and other drawbacks of the traditional virtualization method are due to the software emulation layer that sits between the physical hardware of the host and the operating system that is being run on top of the emulated hardware.

Generally, a container is an image formed using a set of one or more layers. For example, a container may include one layer for modifying the operating system to a specific version or specific customization—e.g., apply Ubuntu™ 14.04 binary to the underlying Linux® operating system (Ubuntu is a trademark of Canonical Ltd. in the United States and in other countries. Linux is a trademark of Linus Torvalds in the United States and other countries); another layer might include configuration data for the operating system customization—e.g., Ubuntu configuration; another layer might apply or remove updates to the modified operating system—e.g., apply Ubuntu system updates; another layer might include an application to be configured in the container—e.g., the binaries of an application server; another layer might include the configuration data of the application server; another layer might include the binary or other data of a user application that is to be executed using the container; another layer might include a set of environment variables that is needed to successfully operate the application server, the user application, or both on the container; and so on. Many different types of layers can be similarly configured in a container image, and any number of layers can be configured in a container image to create a container.

The container-based virtualization technology offers higher performance and less resource footprint when compared to traditional virtualization, and has become an attractive way for cloud vendors to achieve higher density in the datacenter. Thus, containerization (i.e., operating a virtualized data processing environment using container-based virtualization) is changing how workloads are being provisioned on cloud infrastructure.

Technology exists today to operate containers on physical hosts or VMs. Docker and Kubernetes are examples of the container technology that can be operated in this manner (Docker is a trademark of Docker, Inc. in the United States and in other countries. Kubernetes is a trademark of The Linux Foundation in the United States and other countries). An orchestrator is a component of the container technology that manages—or orchestrates—the correct operations and interactions of the containers in existence in a given data processing environment, e.g., in an SDN.

SUMMARY

The illustrative embodiments provide a method, system, and computer program product. An embodiment includes a method that parses, using a processor and a memory, a virtual address of a destination of a packet into a set of virtual address components. The embodiment tokenizes a subset of the set of virtual address components into a token. The embodiment converts token into at least a portion of a hostname. The embodiment looks up a real network address corresponding to the hostname. The embodiment causes the packet to be transmitted to the real network address, wherein the real network address corresponds to a host machine on a physical network, the receiving virtual entity operating on the host machine.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments presented herein are described with respect to either as VM-alone or a container-alone type of deployment circumstance only for the clarity of the illustrative embodiments and not to imply any limitation thereto. A VM-based embodiment configuration can be adapted to a container-based scenario and vice-versa, and such adaptations are contemplated within the scope of the illustrative embodiments. Similarly, an embodiment can be adapted to a mixed deployment scenario including both VMs and containers without departing the scope of the illustrative embodiments. A reference to an orchestrator is contemplated to include not only the orchestration technology for a container-based environment but also a similarly purposed management component for managing VM instances in a VM-based environment. An orchestrator capable of managing a hybrid ecosystem of containers and VMs is also within the contemplated adaptations of the illustrative embodiments.

Furthermore, even though the illustrative embodiments are described with respect to an SDN, the embodiments are not intended to be limited only to SDNs. From this disclosure, those of ordinary skill in the art will be able to conceive ways of adapting an embodiment for use in an underlay or physical network using the operations described herein and such adaptations are also contemplated within the scope of the illustrative embodiments.

The illustrative embodiments recognize that within a data processing environment, e.g., within an SDN, at any given time, hundreds of thousands of containers can be operating on thousands of hosts. Furthermore, the illustrative embodiments recognize that the virtualization of workloads is a dynamic process. VMs and/or containers can be instantiated and destroyed on demand, causing the total ecosystem of virtual entities—whether containers or VMs—to be constantly in flux in the data processing environment.

In a data processing environment, a controller, has the responsibility to manage the data traffic being communicated between the virtual entities operating in that environment. For example, in an SDN, an SDN controller must know where a destination virtual entity of a packet is operating in order to route a packet correctly to that destination virtual entity.

In an SDN, hosts can be started and stopped, NICs can be activated or deactivated in a host, VNICs corresponding to a NIC can be spun up or shut down, a container or VM can be instantiated or destroyed in a host, a container or VM can be moved from one host to another, a container or VM can start or stop using a particular VNIC, and/or a container or VM can change over to a different VNIC in the same host or a different host. These and many other changes can occur in the SDN to cause routing the packets in such a dynamic environment a difficult problem to solve. The illustrative embodiments recognize that in order for a virtual entity to be able to participate in a data communication in the SDN, the location of that entity has to be ascertained. In other words, a physical location—e.g., a physical host whose physical location is defined by a rack, a sled, a slot, a NIC, a port on the NIC, or some combination of these and other similarly purposed physical location identifiers—has to be associated with a virtual entity for data to correctly reach that entity.

The illustrative embodiments further recognize that while a virtual entity, such as a VM or a container, does have a virtual address, where that virtual address exists, i.e., what physical location corresponds to that virtual address, is difficult problem to solve without a discovery operation executing in the network. The illustrative embodiments recognize that because in the SDN, the makeup of the virtual network itself can be in flux, presently, an orchestrator performs a discovery operation using the well-defined, known, and comparatively less-transient physical network of the underlay to perform the discover operation. An orchestrator uses data communications on the physical network to discover which virtual entities have been initiated, changed, moved, or terminated, along with the physical location of the hosts/nodes/cores/NICs and their actual addresses on the physical network to determine how to translate a virtual entity's virtual address to that actual address. Only after such discovery and mapping of the virtual address to the actual address, can the virtual entity correctly participate in data communications in the SDN.

Given the number of dynamic variables that are at play in an SDN, this discovery process is computationally expensive—requiring an undesirably high amount of computing resources and physical networking resources, to maintain correct data communications in the SDN. Furthermore, this discovery process is not only expensive but also time consuming, which introduces latency in the SDN. It takes a finite amount of time for an orchestrator to initiate discovery, a virtual entity to respond to the discovery request, the orchestrator to receive the discovery response, the orchestrator to perform the mapping, the orchestrator to communicate the mapping to the SDN controller, the SDN controller to configure that mapping into a routing mechanism, and only after all of these time-consuming operations, is a virtual entity ready to send or receive data in the SDN. It is entirely likely that a virtual entity is initiated and also destroyed or moved by the time the entity is configured in this manner, requiring a whole new cycle of discovery. This discovery must be performed for hundreds of thousands of virtual entities in existence at any given time in a reasonably sized data processing environment.

Virtualization in data processing environments is a well-recognized technological field of endeavor. The present state of the technology in this field of endeavor has certain drawbacks and limitations. The operations and/or configurations of the illustrative embodiments impart additional or new capabilities to improve the existing technology in the technological field of endeavor of operating and managing virtualized data processing environments, especially in the area of speeding up the data communications in a dynamic virtualized data processing environment while reducing the computing and networking resources required for enabling such data communications.

The illustrative embodiments recognize that the presently available tools or solutions do not address these needs/problems or provide adequate solutions for these needs/problems. The illustrative embodiments used to describe the invention generally address and solve the above-described problems and other related problems by discovery-less virtual addressing in software defined networks.

An embodiment can be implemented as a combination of certain hardware components and a software application. An implementation of an embodiment, or one or more components thereof, can be configured as a modification of an existing controller (e.g., an existing SDN controller), a modification of an existing orchestrator (e.g., an existing VM manager or a container orchestrator), with a companion software application executing in some combination of (i) the controller or orchestrator itself, (ii) a data processing system communicating with the controller or orchestrator over short-range radio or a local area network (LAN), and (iii) a data processing system communicating with the controller or orchestrator over a wide area network (WAN).

Only as a non-limiting example, the illustrative embodiments are described using Transmission Control Protocol/Internet Protocol (TCP/IP) for the data communication protocol and addressing. An embodiment can be adapted to operate with the addressing in other standard or proprietary protocols and data communication regimes. An embodiment described with respect to IPv4 addressing in TCP/IP can be adapted to operate in a similar manner with IPv6 addressing. Such adaptations are contemplated within the scope of the illustrative embodiments but IPv4 addressing in TCP/IP is used in the illustrative embodiments as this combination is presently the most commonly deployed protocol and addressing in physical and virtual networks and therefore imparts clarity to the description of the illustrative embodiments.

Given a type of address used in a virtual network, an embodiment configures a manner of parsing the address into a set of address components. For example, in an IPv4 type of address 192.168.22.33, each of the four numbers separated by the "." separator is an octet (represented in binary with 8 bits). One embodiment regards each octet (e.g., "192", "168, "22", and "33") in the IPv4 address as an address component. Another embodiment regards the highest four bits of the third octet (e.g., the highest four bits representing "22" in the example address) as one address component and the lower four bits plus the lowest octet (e.g., the lowest four bits representing "22" and the eight bits representing "33" in the example address) as another address component.

Generally, an embodiment can be configured to parse a given address in any chosen manner, not limited to a structure that is known or specified for the type of address. In the example IPv4 address, an embodiment can select any number of bits from any of the one or more specified octets to form a component. It is possible to adapt an embodiment to select x number and/or position of bit(s) from one octet, y number and/or position of bit(s) from another octet, and so on, to form a component, where such manner of reading the IPv4 address is not a standard or specified manner of reading or parsing an IPv4 address.

Using this methodology, in one example implementation, an embodiment can be configured such that all the highest bits from the four octets could be read as one four-bit address component, all the second-highest bits from the four octets could be read as another four-bit address component, and so on, to obtain a total of eight four-bit address components from a given IPv4 address. In another example implementation a media access control address (MAC address) can be parsed into a set of address components in many different ways. For example, an embodiment can be configured to divide the 48 bits representing a standardized MAC address into address components in a standard or non-standard manner by combining different bits from different parts of the 48-bit address.

An embodiment tokenizes an address component constructed in this manner. Tokenization is the process of forming a representation from a given address component. For example, a token may be a rack identifier and an embodiment maps one or more address components to a rack identifier token. As another example, a token may be a sled identifier and an embodiment maps one or more address components to a sled identifier token (a sled is a fixture or partition in a physical rack, and a server hardware is housed in a sled in a rack). Similarly, other combinations of address components can be tokenized to form one or more tokens that represents a portion of a physical identifier of a hardware in the physical network.

As a non-limiting example, an address component formed from highest four bits of the third octet of an IPv4 address can form a rack identifier token, such that binary 0011 in those four bits represents decimal value 3 and forms rack identifier 3 (e.g., token "rack0003"). Another address component formed from lowest third octet of an IPv4 address can form a sled identifier token, such that binary 00001111 in those eight bits represents decimal value 15 and forms sled identifier 15 (e.g., "sled0015"). Tokens "rack0003" and "sled0015" represents portions of a physical identifier of a hardware in the physical network. For example, the physical identifier rack0003_sled0015 could be a hostname of a server hardware in rack 3 sled 15 in a datacenter. A prerequisite for this manner of tokenization is that a hardware component, e.g., a server hardware, when installed in rack 3 and sled 15 be associated with an identifier of rack003_sled0015. Note that this example or any other example in this disclosure does not imply any restriction on how to tokenize portions of identifiers of physical components, how to concatenate or manipulate different tokens to form such identifiers, or both. For example, a decimal value of 3 may not represent rack 3 but perhaps rack 7346 according to some function applied to binary 0011, a decimal value of 15 may not represent sled 15 but perhaps NIC 6 in rack 7346 according to some function applied to binary 1111, and token "rack7346" and "NIC6" may be combined by a function as identifier "73460000000006" or "ahiwdhbascjkhu" instead of "rack7346_NIC6".

An embodiment converts an identifier into a hostname that can be looked up using a Domain Name Service (DNS) or an equivalent lookup service. For example, in one embodiment, identifier "rack0003_sled0015" maps to hostname "rack0003_sled0015". In another embodiment, identifier "rack0003_sled0015" maps to hostname "ServerJohnDoe". In another embodiment, identifier "rack0003_sled0015" maps to hostname "ServerYforClientXdatabaseBackend". A lookup entry in a DNS or another lookup service then maps "rack0003_sled0015" or "ServerJohnDoe" or "ServerYforClientXdatabaseBackend" to a real physical network address, e.g., 32.64.55.132 or 47.138.99.123:8080, or 4C:EE:02:F0:AC:11, or another suitable address format.

Thus, a virtual entity that is spun up with a virtual address of w.x.y.z automatically maps to a physical and reachable component at physical address a.b.c.d:p without any need to discovering the virtual entity first via a physical network, reporting the discovered entity to the virtual network controller, as is the limitation in the presently available solutions. According to the illustrative embodiments, without requiring a discovery (discovery-less) a virtual entity, e.g., a VM or a container, when instantiated, changed, or moved, and configured with a corresponding virtual address automatically provides enough information to resolve the virtual entity to a real reachable address of a physical location of a hardware component for data communications.

These examples of addresses, components, tokens, combinations, mappings, functions, or translations are not intended to be limiting. From this disclosure, those of ordinary skill in the art will be able to conceive many other addresses, components, tokens, combinations, mappings, functions, and translations and the same are contemplated within the scope of the illustrative embodiments.

The manner of discovery-less virtual addressing in software defined networks described herein is unavailable in the presently available methods in the technological field of endeavor pertaining to virtualization in data processing environments. A method of an embodiment described herein, when implemented to execute on a device or data processing system, comprises substantial advancement of the functionality of that device or data processing system in operating and managing virtualized entities in virtualized and physical networks.

The illustrative embodiments are described with respect to certain types of virtualized entities, physical components, controllers, orchestrators, networks, networking components, lookup services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
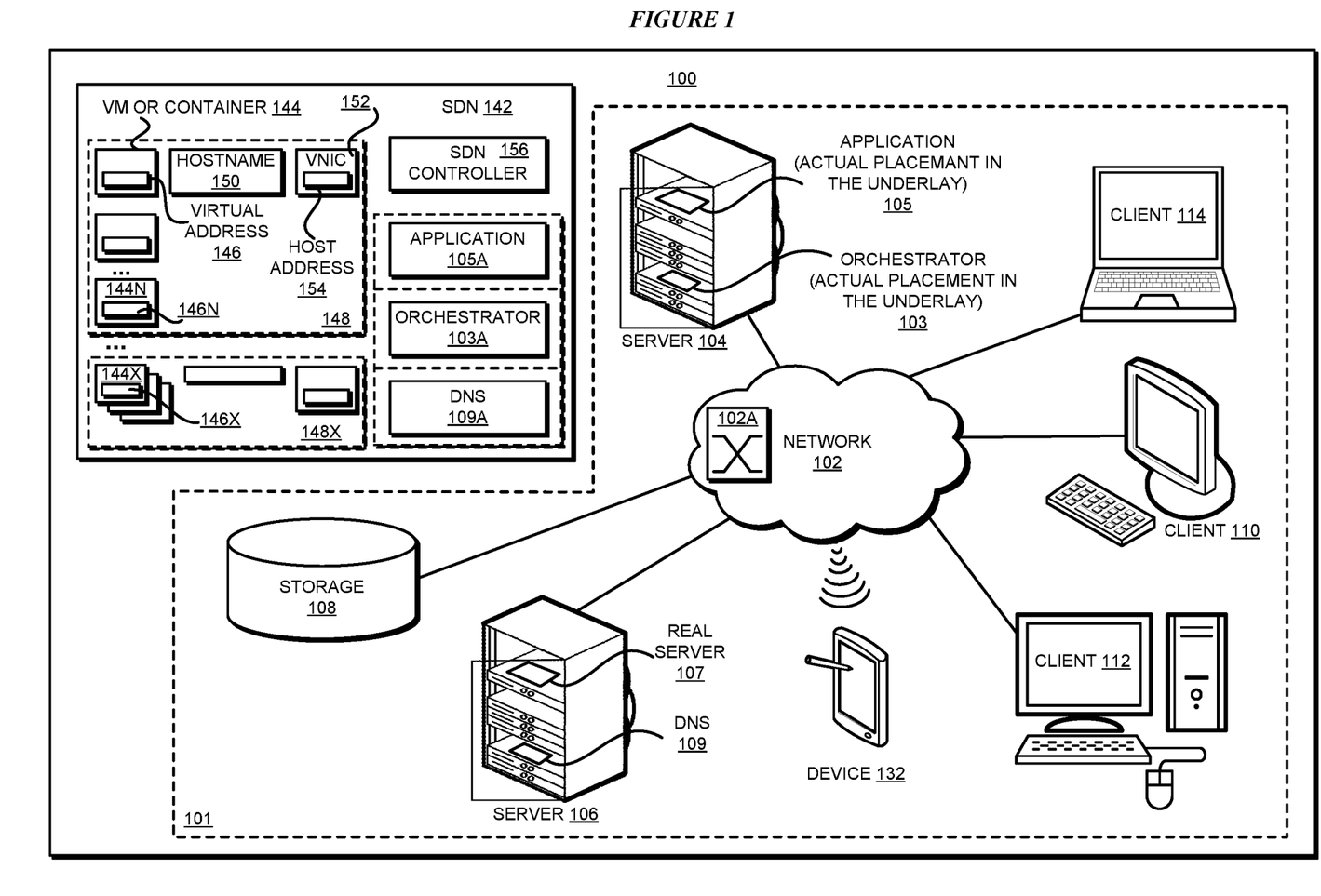
FIG. 1 depicts a block diagram of a network of data processing systems in which illustrative embodiments may be implemented.
Figure 2:
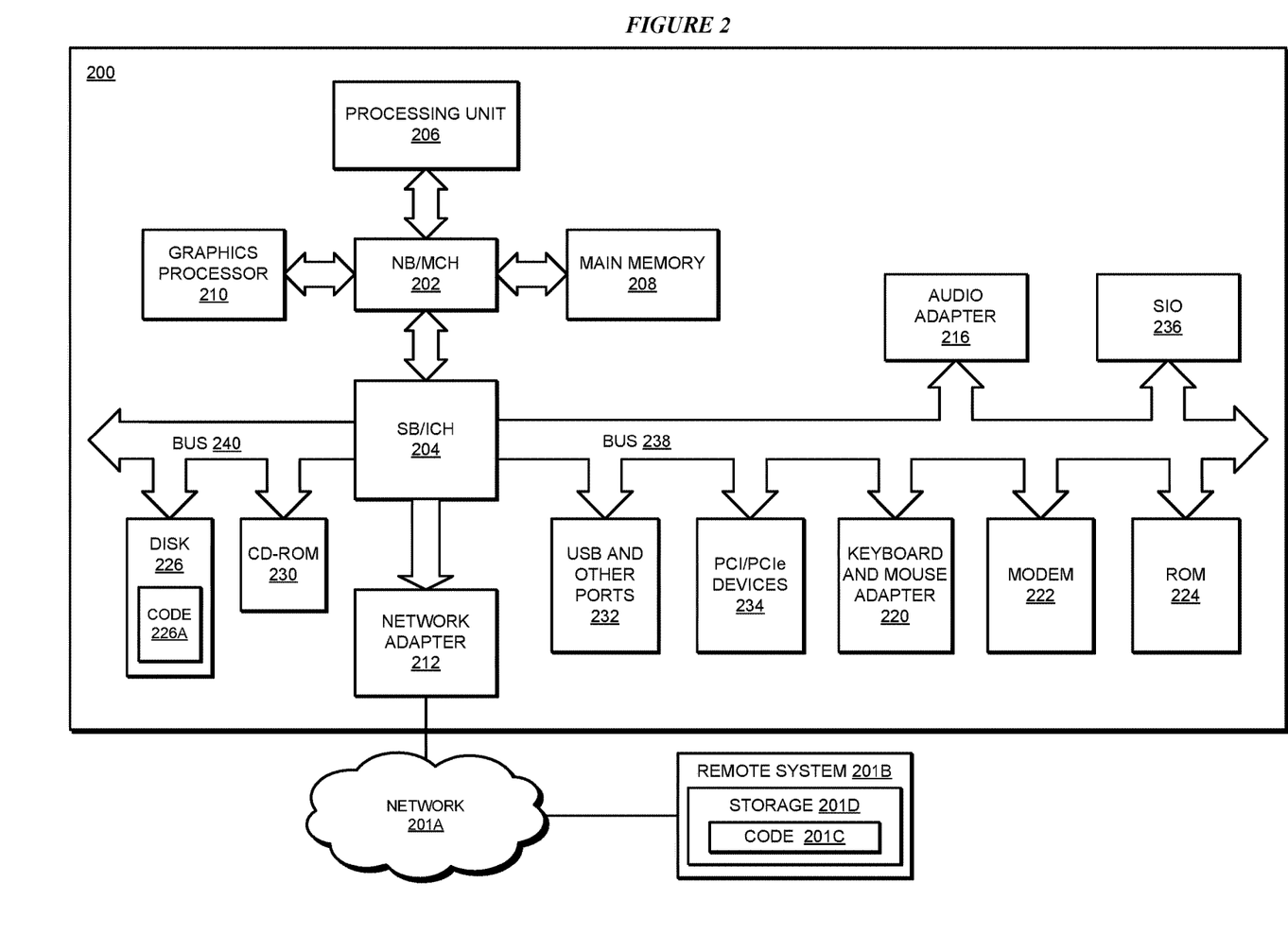
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 and the resources connected thereto forms data plane 101 over which SDN 142 is overlaid. Data plane 101 includes data processing system components, such as orchestrator 103, and physical networking components, such as switch 102A. SDN 142 implements virtual representations of one or more components, such as virtual entity 144 which may be a VM or a container, and is configured with virtual address 146. Any number of virtual entities 144-144X with corresponding virtual addresses 146-146X may be configured on data processing system 148-148X in SDN 144. Virtual system 148-148X may be a virtualized view of a host or a cluster (not shown) of hosts in the underlay. Virtual systems 148-148X may be optional in one implementation.

A set of virtual entities 144-144N with corresponding virtual addresses 146-146N is configured on virtual system 148, which operates using one or more hardware servers in data plane 101, e.g., real server 107. Virtual system 148 is configured with hostname 150, which is the hostname of the underlying real host/hosts/cluster. When virtual system 148 is optional, hostname 150 is a hostname configured in the underlying host, e.g., in real server 107. Virtual system 148 is further configured with VNIC 152, which maps to a real reachable address 154 for virtual system 148, or the underlying real server 107 or cluster, depending on the particular implementation via zero of more address translations between virtual system 148 in SDN 142 and real server 107 or cluster in data plane 101. SDN controller 156 operates SDN 142 and manages the data traffic in SDN 142 as described herein.

Orchestrator 103A performs an orchestration function for virtual entities 144-144X in SDN 142. Orchestrator 103A can be installed and operating as orchestrator 103 via an actual placement in server 104 in data plane 101. DNS (or another lookup service) 109A is available in SDN 142. DNS 109A can be installed and operating as DNS 109 via an actual placement in a server, such as but not limited to server 106, in data plane 101.

Application 105A implements an embodiment described herein. Application 105A can be installed and operating as application 105 via an actual placement in a server, such as but not limited to server 104, in data plane 101. Application 105A operates in conjunction with orchestrator 103A, SDN controller 156, or both in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a smartphone, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system With reference to FIG. 3, this figure depicts a block diagram of an example problem in the presently available solutions with discovering virtual entities, which can be solved in accordance with an illustrative embodiment. In configuration 300, physical network 302 is similar to network 102 in FIG. 1. Any number of hosts 304A, 302B . . . 302C, each similar to server 106 or 107, are operational in network 302.

Figure 3:
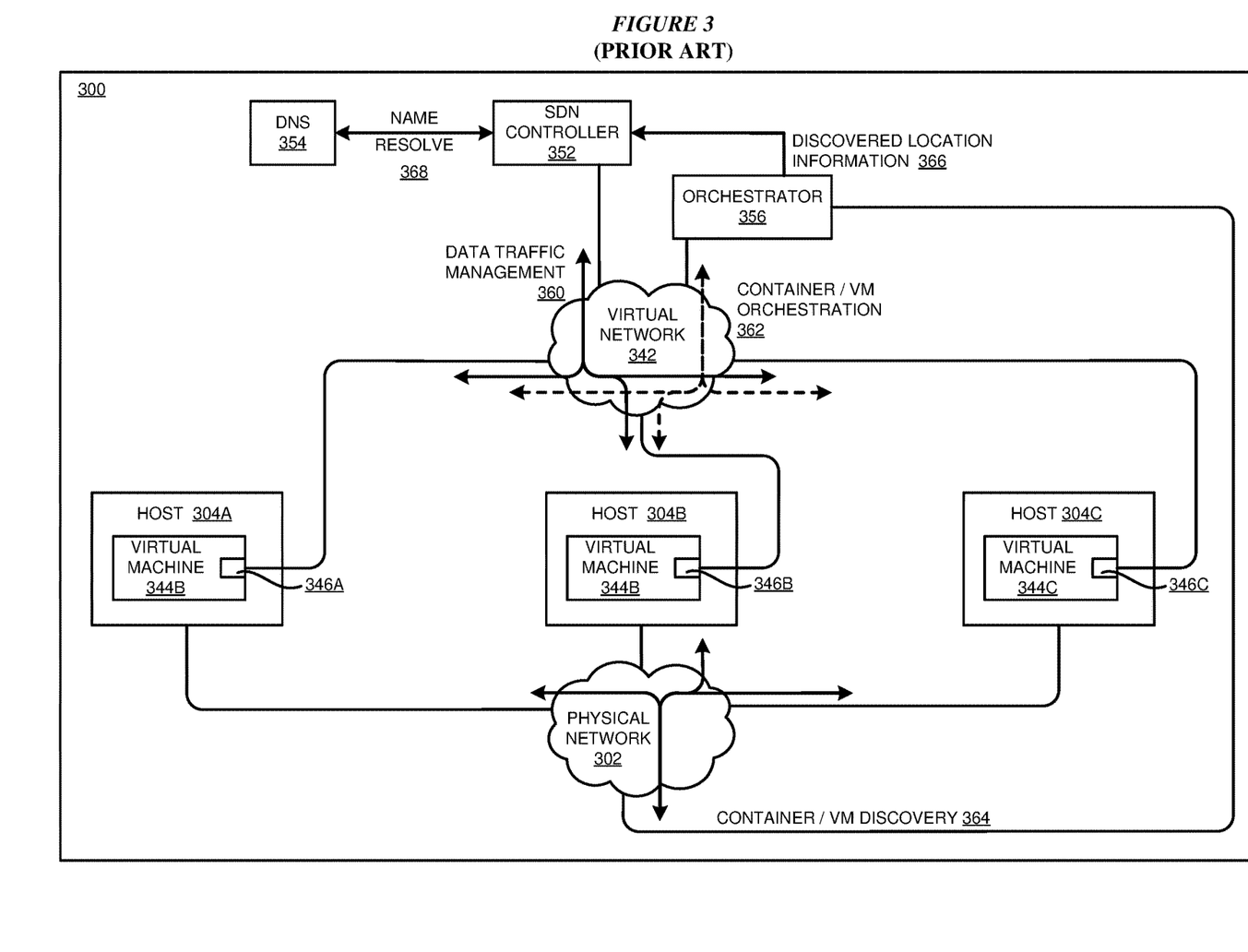
FIG. 3 depicts a block diagram of an example problem in the presently available solutions with discovering virtual entities, which can be solved in accordance with an illustrative embodiment.

Virtual network 342 operates with virtual entities in a virtualized data processing environment, e.g., in SDN 142 of FIG. 1. As a non-limiting example, assume that virtual entity 344A is configured to operate using host 304A's resources, virtual entity 344B is configured to operate using host 304B's resources, . . . virtual entity 344C is configured to operate using host 304C's resources. Virtual entity 344A is configured with, and is reachable in virtual network 342 via virtual address 346A. Virtual entity 344B is configured with, and is reachable in virtual network 342 via virtual address 346B. Virtual entity 344C is configured with, and is reachable in virtual network 342 via virtual address 346C.

SDN controller 352 is similar to SDN controller 156 in FIG. 1. SDN controller 352 is coupled with virtual network 342 to perform data traffic management function 360 for data traffic flowing between virtual entities 344A . . . 344C.

DNS (or another comparable lookup service) 354 is similar to DNS 109A in FIG. 1. SDN controller 352 performs hostname resolving operation 368 using DNS 354 by sending a request to DNS 354 with a hostname and obtaining a corresponding reachable network address to which the hostname resolves (if at all) in physical network 302.

Orchestrator 356 is similar to orchestrator 103A in FIG. 1. Orchestrator 356 is coupled with virtual network 342 to perform orchestration function 362 for virtual entities 344A . . . 344C. Undesirably, orchestrator 356 also requires access and use of physical network 302 to perform discovery function 364 in a manner described herein, for virtual entities 344A . . . 344C as they might be instantiated, moved, changed, or destroyed. Orchestrator 356 communicates to SDN controller 352 information 366 resulting from discovery operation 364. By virtue of information 366, SDN controller 352 learns about the entities existing in virtual network 342 and performs data traffic management function 360 and other functions relative to such virtual entities.

Figure 4:
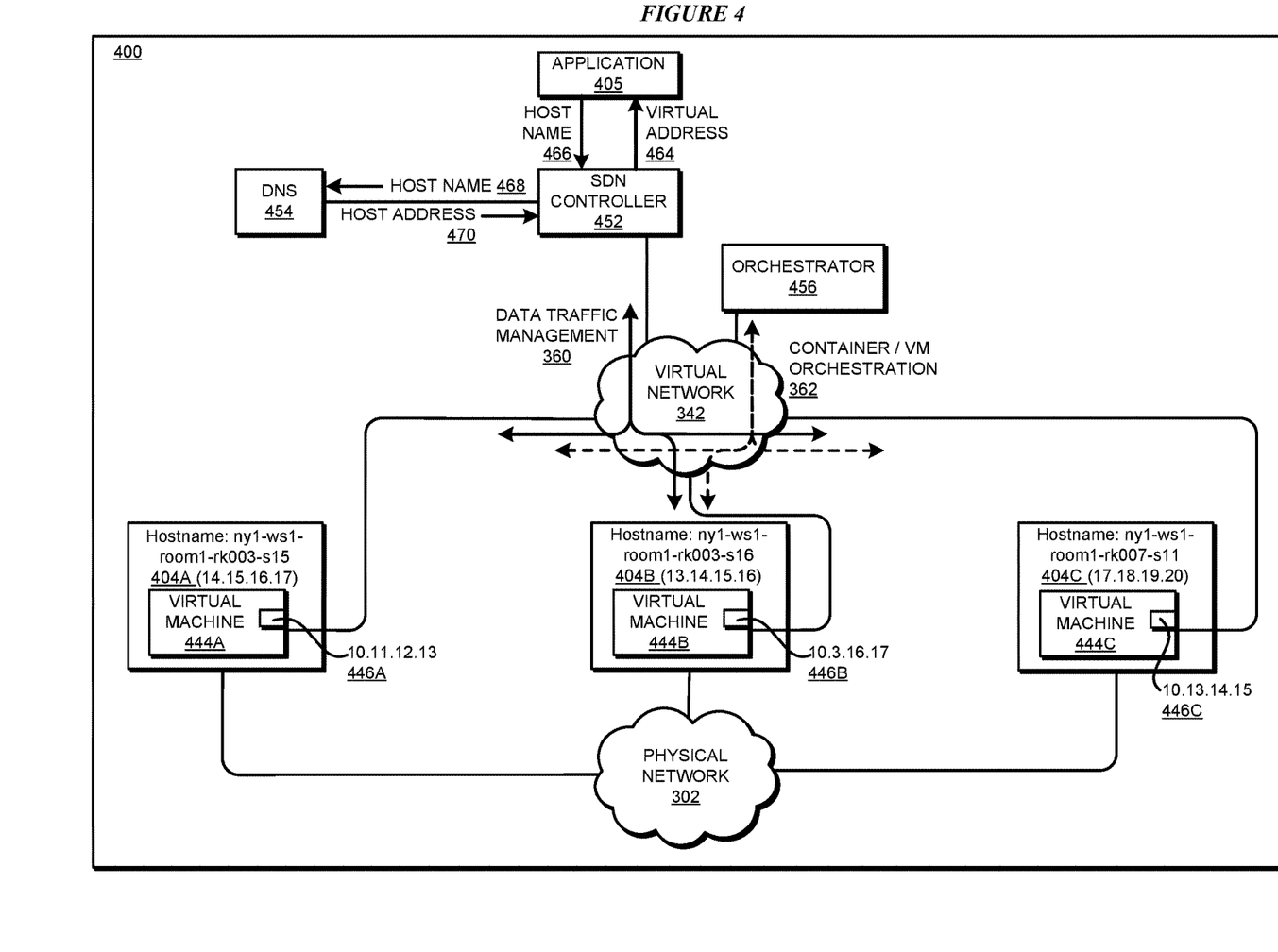
FIG. 4 depicts a configuration for discovery-less virtual addressing in software defined networks in accordance with an illustrative embodiment.

With reference to FIG. 4, this figure depicts a configuration for discovery-less virtual addressing in software defined networks in accordance with an illustrative embodiment. Configuration 400 is an improvement over configuration 300 in FIG. 3.

In configuration 400, physical network 302 is the same as or similar to network 302 in FIG. 3. Any number of hosts 404A, 404B . . . 404C, each similar to hosts 304A, 302B . . . 302C, respectively, and configured with a corresponding hostname constructed in a manner according to an embodiment described herein, are operational in network 302. As a non-limiting example, suppose that the hostname is constructed by concatenating (with a "-" delimiter) a geographical location identifier (e.g., ny1 or NewYorkX or some suitable encoded or plaintext identifier), datacenter identifier (e.g., ws1 or WallStreetY or some suitable encoded or plaintext identifier), server room identifier (e.g., room1 or RoomN or some suitable encoded or plaintext identifier), rack identifier (rk . . . or RackZ or some suitable encoded or plaintext identifier), and sled identifier (s . . . or SledM or some suitable encoded or plaintext identifier).

Virtual network 342 is the same as or similar to virtual network 342 in FIG. 3. As a non-limiting example, assume that virtual entity 444A is configured to operate using host 404A's resources, virtual entity 444B is configured to operate using host 404B's resources, . . . virtual entity 444C is configured to operate using host 404C's resources. Virtual entity 444A is configured with, and is reachable in virtual network 342 via virtual address 446A, which is set to e.g., 10.11.12.13. Virtual entity 444B is configured with, and is reachable in virtual network 342 via virtual address 446B, which is set to e.g., 10.3.16.17. Virtual entity 444C is configured with, and is reachable in virtual network 342 via virtual address 446C, which is set to e.g., 10.13.14.15.

Application 405 is similar to application 105A in FIG. 1. SDN controller 452 is similar to SDN controller 352 in FIG. 3, except that SDN controller 452 has been improved to communicate with application 405 in accordance with an embodiment. SDN controller 452 is coupled with virtual network 342 to perform data traffic management function 360 for data traffic flowing between virtual entities 444A . . . 444C.

DNS (or another comparable lookup service) 454 is similar to DNS 354 in FIG. 3, except that DNS 454 is configured to resolve hostnames configured in the manner described herein.

Orchestrator 456 is similar to orchestrator 356 in FIG. 3, except that orchestrator has been improved to not perform the discover function 364 of FIG. 3 (at least not perform discovery 364 for the reasons described herein). In some cases (not shown) here, orchestrator 456 is further improved to communicate with application 405 in accordance with an embodiment. Orchestrator 456 is coupled with virtual network 342 to perform orchestration function 362 for virtual entities 444A . . . 444C. Desirably, orchestrator 456 does not access and use of physical network 302 to perform discovery function 364 in a manner of FIG. 3. Orchestrator 456 also, desirably, need not communicate to SDN controller 452 information 366 resulting from discovery operation 364 as in FIG. 3. By virtue of an operation of application 405, SDN controller 352 learns about the hostnames corresponding to the entities existing in virtual network 342 and is able to lookup the host addresses to perform data traffic management function 360 and other functions relative to such virtual entities.

During operation, SDN controller 452 detects a packet with a destination address being a virtual address of an entity that is not previously known to SDN 452. SDN 452 sends (464) the virtual address to application 405. Application 405 returns response (466) containing a hostname derived from the virtual address in a manner described herein. SDN controller 452 sends (458) the hostname received from application 405 to DNS 454. DNS 454 responds (470) to SDN controller 452 with a host address (if any) that corresponds to the hostname in request 468. SDN controller 452 uses the host address received from DNS 454 to route the packet to the destination.

In the depicted example, suppose that virtual entity 444A sends a packet to virtual entity 444B. Further suppose that entity 444B has been instantiated and not yet known to SDN controller 452. Finding a destination virtual address 10.3.16.17 in the packet, SDN controller 452 requests application 405 to provide a hostname. Application 405, using a non-limiting example function on virtual address 10.3.16.17 finds that the second octet value represents the rack (3=rack 3=rk0003), the third octet represents the sled (16=sled 16=s16), in a geographical location, datacenter, and server room identified by the first octet value 10 (e.g., ny1, ws1, and room1). Application 405 thus applies a function to tokenize components of the address, and to combine the tokens to form a hostname, to wit, ny1-ws1-room1-rk003-s16 as shown. Application 405 returns hostname ny1-ws1-room1-rk003-s16 to SDN controller 452. SDN controller 452 sends hostname ny1-ws1-room1-rk003-s16 to DNS 454. DNS 454 finds address, e.g., 13.14.15.16, a real and reachable address of a host operating on physical network 302, corresponding to the hostname. DNS 454 returns 13.14.15.16 to SDN controller 452. SDN controller routes the packet to address 13.14.15.16 without having previously known that virtual entity 444B is operating on host 404B, which has hostname ny1-ws1-room1-rk003-s16 and address 13.14.15.16.

Figure 5:
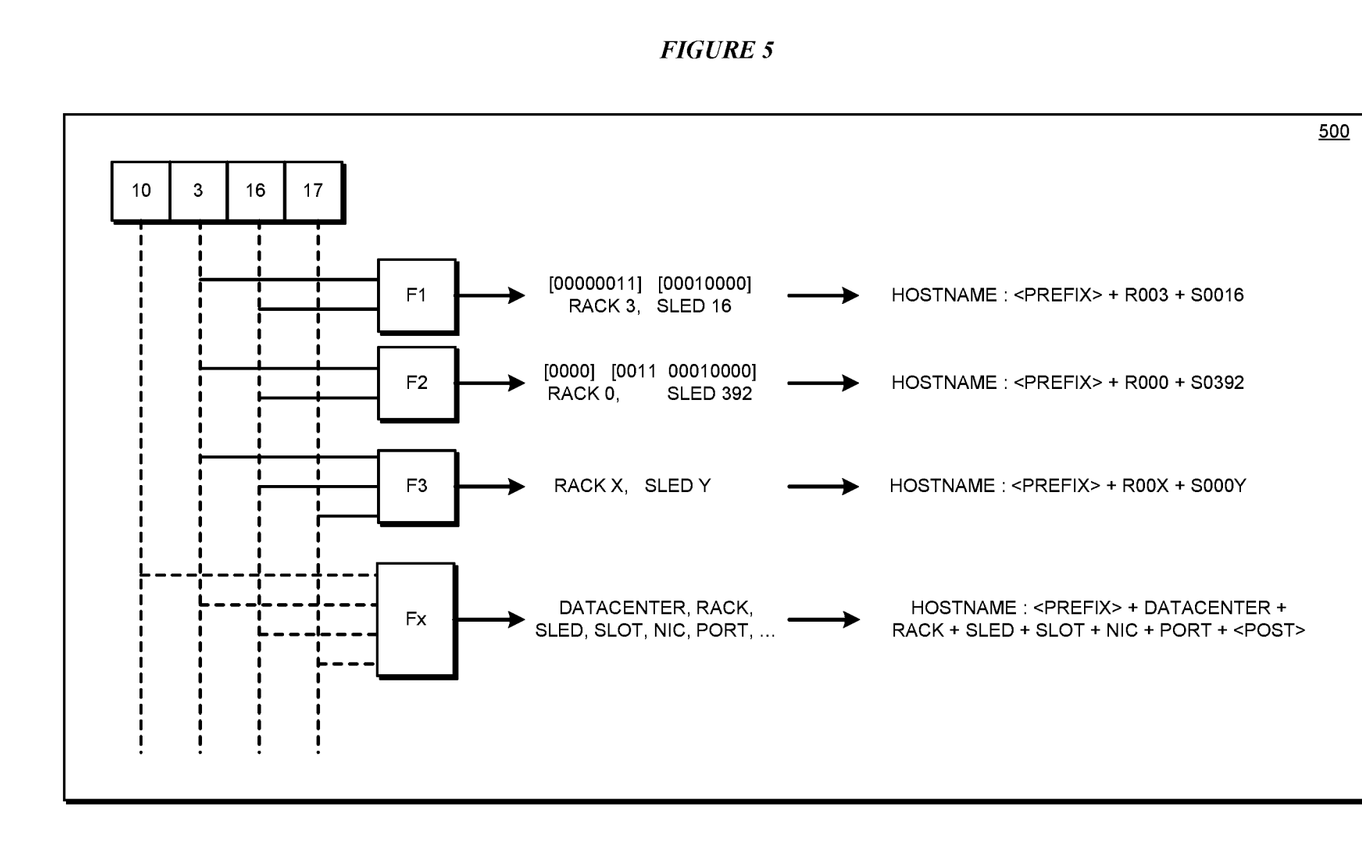
FIG. 5 depicts a block diagram of an example method for constructing hostnames from tokenized address components in accordance with an illustrative embodiment.

With reference to FIG. 5, this figure depicts a block diagram of an example method for constructing hostnames from tokenized address components in accordance with an illustrative embodiment. Method 500 can be implemented in application 405 in FIG. 4.

Different functions applied to different components extracted from a virtual address can result in different tokens, a combination of some or all of the tokens can then be used to construct a hostname. As one non-limiting example, suppose that the application selects function F1 to apply to the second and third octets of an example IPv4 virtual address 10.3.16.17. Function F1 takes the second octet value (binary 00000011, decimal 3) and the third octet (binary 00010000, decimal 16) as inputs, and produces rack identifier R003, and sled identifier S0016, respectively. Function F1 applies a suitable prefix, which can be either fixed or derived from other components of the virtual address.

As another non-limiting example, suppose that the application selects function F2 to apply to the second and third octets of an example IPv4 virtual address 10.3.16.17. Function F2 takes the highest four bits of the second octet value (binary 0000, decimal 0) and the lower four bits and all eight bits of the third octet (binary 001100010000, decimal 392) as inputs, and produces rack identifier R000, and sled identifier S0392, respectively. Function F2 applies a suitable prefix, which can be either fixed or derived from other components of the virtual address.

As another non-limiting example, suppose that the application selects function F3 to apply to the second, third, and fourth octets of an example IPv4 virtual address 10.3.16.17. Function F3 takes some combination of bits from the three octets to compute a value for the rack identifier (R00X). Function F3 takes some combination of bits from the three octets to compute a value for the sled identifier (S00Y). Function F3 applies a suitable prefix, which can be either fixed or derived from other components of the virtual address.

As a generalized non-limiting example, function Fx uses some combination of the four octets of the example IPv4 virtual address. Function F4 computes some combination of a variety of tokens, including but not limited to a prefix, a datacenter identifier, a rack identifier, a sled identifier, slot identifier, NIC identifier, port identifier, and a postfix and one or more delimiters.

Any of functions F1-Fx can be further configured to derive a hostname from a selected subset of the all or some of the constructed tokens. Alternatively, a separate function can be configured to take the set of constructed tokens as input and output a hostname that is derived from a selected subset of the all or some of the constructed tokens.

Figure 6:
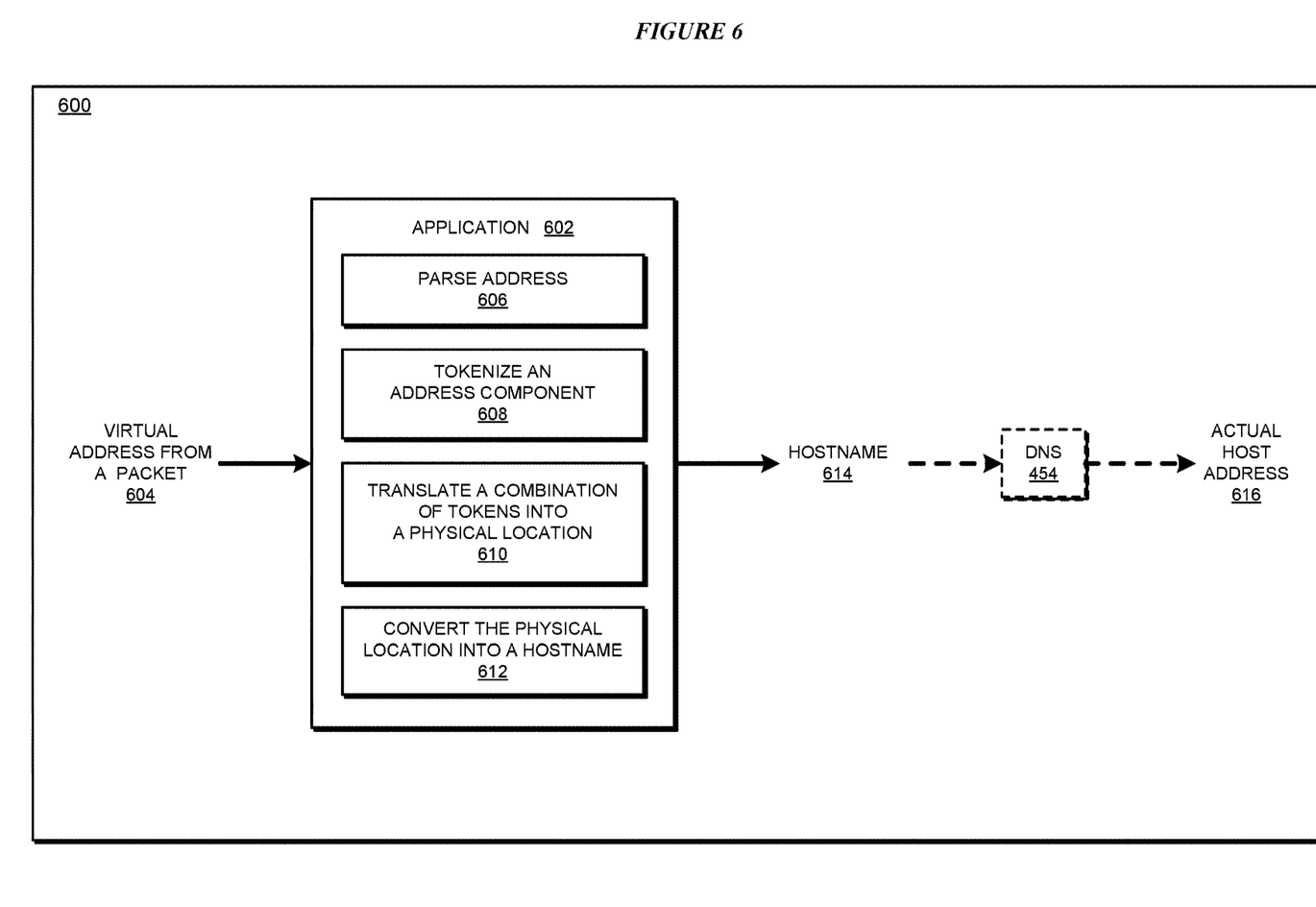
FIG. 6 depicts a block diagram of an application for discovery-less virtual addressing in software defined networks in accordance with an illustrative embodiment.

With reference to FIG. 6, this figure depicts a block diagram of an application for discovery-less virtual addressing in software defined networks in accordance with an illustrative embodiment. Application 602 of configuration 600 can be implemented as application 405 in FIG. 4.

Application 602 receives a virtual address (extracted from a packet) as input 604. Component 606 parses input 604 into a set of address components, e.g., by applying a suitably configured function, as described herein. Component 608 tokenizes one, some, or all address components, e.g., by applying a suitably configured function, as described herein. Component 610 translates a combination of some or all tokens into a physical location component, e.g., by applying a suitably configured function, as described herein. Component 612 converts one, some, or all physical location components into a hostname, e.g., by applying a suitably configured function, as described herein.

Application outputs hostname 614. A DNS or another lookup service, e.g., DNS 454 in FIG. 4, looks up and returns real network address 616 corresponding to hostname 614.

Figure 7:
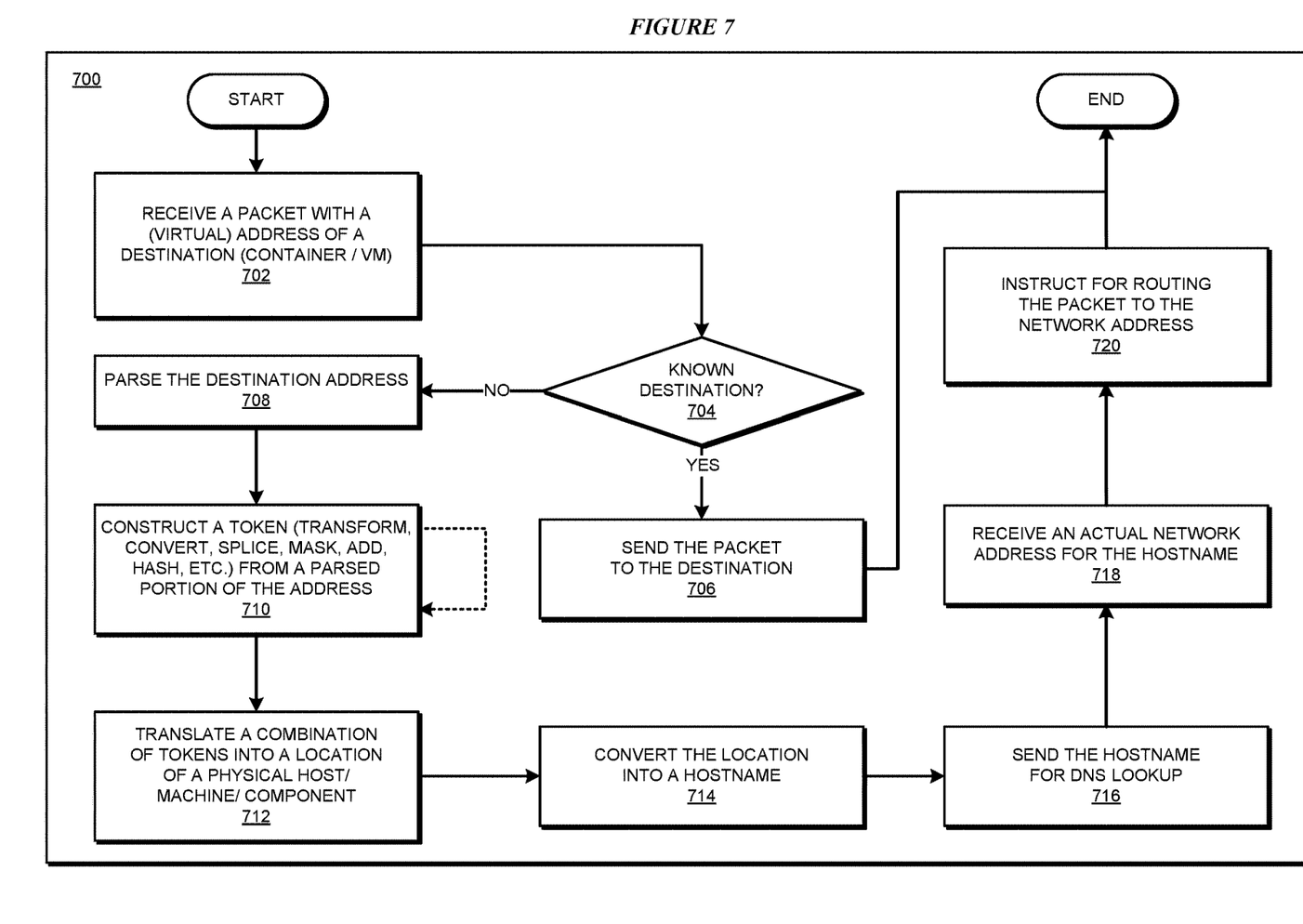
FIG. 7 depicts a flowchart of an example process for discovery-less virtual addressing in software defined networks in accordance with an illustrative embodiment.

With reference to FIG. 7, this figure depicts a flowchart of an example process for discovery-less virtual addressing in software defined networks in accordance with an illustrative embodiment. Process 700 can be implemented in application 602 of FIG. 6 which is operating in combination with an SDN controller and/or an orchestrator as described herein.

Process 700 begins when a packet is received, e.g., at a controller in an SDN, where the packet has a virtual address as a destination (block 702). The application receives the virtual address from block 702. The application determines whether the address is a known destination (block 704). If the address is a known destination ("Yes" path of block 704), the application causes the packet to be sent to the known destination, e.g., by supplying a known hostname which can be looked up in a DNS or by supplying the real network address of the host (block 706). The application ends process 700 thereafter, or returns to block 702 for processing more packets.

If the address is not a known destination ("No" path of block 704), the application parses the virtual address in a manner described herein into a set of address components (block 708). The application constructs a set of tokens from the address components (block 710). A tokenizing function may apply one or more types of transformation in tokenizing an address component, including but not limited to adding, subtracting, multiplying, dividing, hashing, concatenating, extracting a substring, or otherwise transforming the address component with another value. Any number of address components can be tokenized in this manner by repeating block 710.

The application translates a combination of tokens into a set of one or more location address components of a physical host, machine, cluster, or component (block 712). The application constructs a hostname from a combination of the location address components (block 714). The application sends the hostname, which can then be looked up in a look up service for a corresponding real network address (block 716). In one embodiment, the application performs the lookup and directly supplies the real network address in response to receiving the virtual address, instead of returning a hostname.

The application obtains, or causes to be obtained, a real network address corresponding to the hostname (block 718). The application instructs, or causes an instruction to be sent, to transmit the packet of block 702 to the real network address (block 720). The application ends process 700 thereafter, or returns to block 702 to process more packets.

Thus, a computer implemented method, system or apparatus, and computer program product are provided in the illustrative embodiments for discovery-less virtual addressing in software defined networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising:
   parsing, using a processor and a memory, a virtual address of a destination virtual entity of a packet into a set of virtual address components;
   tokenizing a subset of the virtual address components into a token;
   converting the token into at least a portion of a hostname;
   looking up a real network address corresponding to the hostname; and
   causing the packet to be transmitted to the real network address, wherein the real network address corresponds to a host machine on a physical network, the destination virtual entity operating on the host machine.

2. The method of claim 1, wherein a virtual address component comprises: a portion of an Internet Protocol(IP) address.

3. The method of claim 2, wherein the portion is defined as an octet component of an IPv4 address.

4. The method of claim 2, wherein the portion comprises only a subset of bits from a defined octet component of an IPv4 address.

5. The method of claim 2, wherein the portion comprises (i) a first subset of bits from a first defined octet component of an IPv4 address and (ii) a second subset of bits from a second defined octet component of an IPv4 address.

6. The method of claim 1, wherein a virtual address component comprises: a portion of Media Access Control (MAC) address.

7. The method of claim 1, further comprising:
receiving the packet from a sending virtual entity operating in a virtual data processing environment;
determining that the real network address of the host machine of the destination virtual entity is unknown in the virtual data processing environment; and
omitting a discovery operation on the physical network to determine an association between the destination virtual entity and the host machine.

8. The method of claim 7, wherein the virtual data processing environment comprises a software defined network (SDN), and wherein the packet is received at a controller in the SDN.

9. The method of claim 1, wherein the destination virtual entity comprises a virtual machine (VM).

10. The method of claim 1, wherein the destination virtual entity comprises a container.

11. The method of claim 1, wherein the tokenizing comprises:
applying a function to combine a first virtual address component and a second virtual address component from the subset of virtual address components to form a combined component; and applying a transformation to the combined component.

12. The method of claim 1, further comprising:
forming, as a part of the tokenizing, a set of tokens, a first token in the set of tokens using a different subset of virtual address components relative to a second token in the set of tokens, the set of tokens comprising the token; and
converting a subset of the set of tokens into the at least the portion of the hostname.

13. The method of claim 1, wherein the portion of the hostname comprises a rack identifier where the host machine is physically located.

14. The method of claim 1, wherein the portion of the hostname comprises a sled identifier where the host machine is physically located.

15. The method of claim 1, further comprising:
adding a prefix to the portion of the hostname, wherein the prefix is preset.

16. The method of claim 1, further comprising:
adding a prefix to the portion of the hostname, wherein the prefix is derived from a second subset of virtual address components.

17. The method of claim 1, further comprising:
adding a prefix to the portion of the hostname, wherein the prefix comprises an identifier in a geographical location of the host machine.

18. The method of claim 1, further comprising:
adding a postfix to the portion of the hostname, wherein the postfix comprises an identifier in a network location of the host machine in the physical network.

19. A computer usable program product comprising a computer-readable storage device, and program instructions stored on the storage device, the stored program instructions comprising:
program instructions to parse a virtual address of a destination virtual entity of a packet into a set of virtual address components;
program instructions to tokenize a subset of the virtual address components into a token;
program instructions to convert the token into at least a portion of a hostname;
program instructions to look up a real network address corresponding to the hostname; and
program instructions to cause the packet to be transmitted to the real network address, wherein the real network address corresponds to a host machine on a physical network, the destination virtual entity operating on the host machine.

20. The computer usable program product of claim 19, wherein the stored program instructions are stored in a computer readable storage device in a data processing system, and wherein the stored program instructions are transferred over a network from a remote data processing system.

21. The computer usable program product of claim 19, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the downloaded program instructions; and
program instructions to generate an invoice based on the metered use.

22. A computer system comprising a processor, a computer-readable memory, and a computer-readable storage device, and program instructions stored on the storage device for execution by the processor via the memory, the stored program instructions comprising:
program instructions to parse a virtual address of a destination virtual entity of a packet into a set of virtual address components;
program instructions to tokenize a subset of the virtual address components into a token;
program instructions to convert the token into at least a portion of a hostname;
program instructions to look up a real network address corresponding to the hostname; and
program instructions to cause the packet to be transmitted to the real network address, wherein the real network address corresponds to a host machine on a physical network, the destination virtual entity operating on the host machine.

* * * * *